Patented July 25, 1933

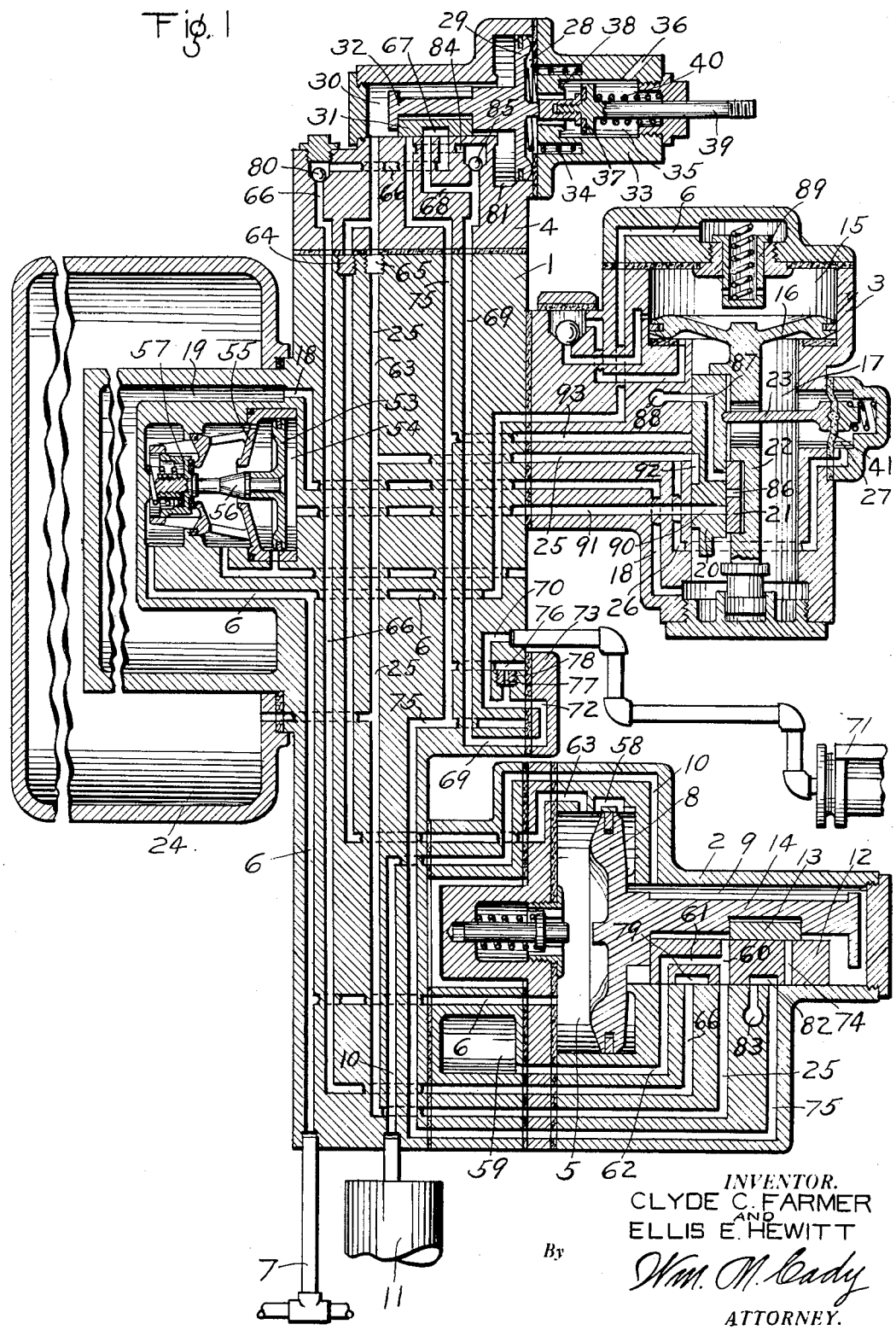

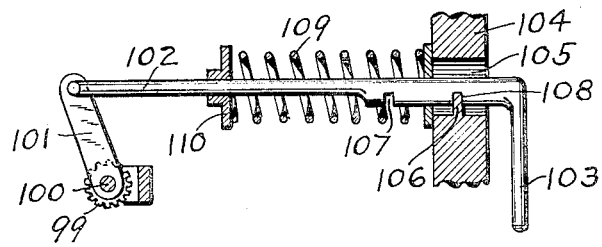
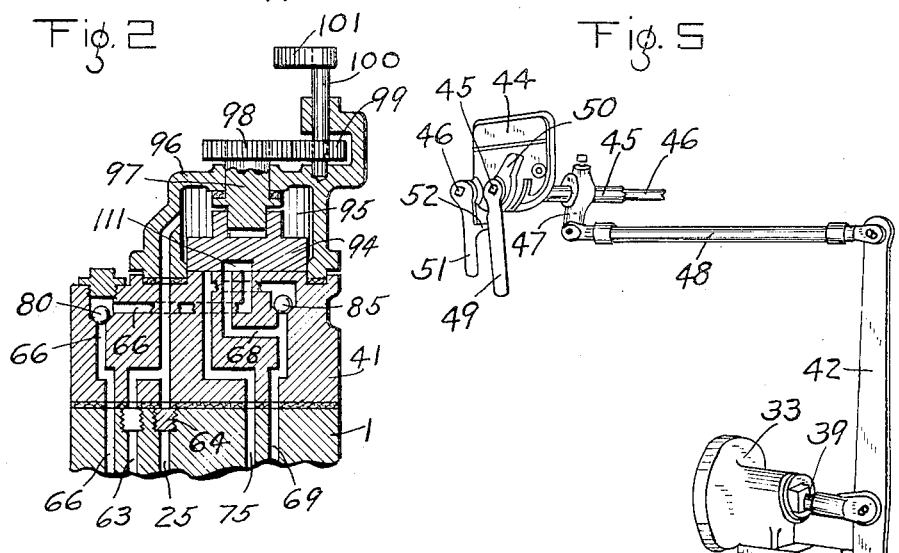
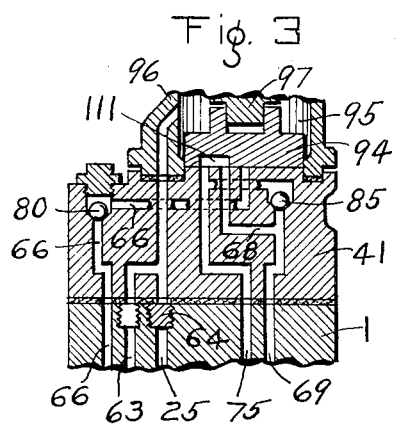

1,919,422

UNITED STATES PATENT OFFICE

CLYDE C. FARMER, OF PITTSBURGH, AND ELLIS E. HEWITT, OF EDGEWOOD, PENNSYLVANIA, ASSIGNORS TO THE WESTINGHOUSE AIR BRAKE COMPANY, OF WILMERDING, PENNSYLVANIA, A CORPORATION OF PENNSYLVANIA

FLUID PRESSURE BRAKE

Application filed October 15, 1931. Serial No. 568,901.

This invention relates to fluid pressure brakes, and more particularly to a fluid pressure brake equipment having means for delaying the application of the brakes on cars at the head end of the train, so that the brakes on cars at the rear end of the train will be applied more nearly in synchronism with the application of the brakes on cars at the head end of the train.

Particularly on very long trains, there is danger of causing excessive and damaging shocks, when the brakes are applied, due to the fact that the brakes are applied on the cars at the head end of the train, before they are applied on the cars at the rear end of the train, so that the slack on the train is permitted to run so harshly as to cause excessive shocks.

It has heretofore been proposed to provide a fluid pressure brake equipment having means adapted to be automatically adjusted, so that when the brakes are applied, the application of the brakes on the cars at the front end of the train will be delayed, while the brakes on the cars at the rear end of the train will be applied in the conventional manner, which results in the brakes on the train being applied throughout the train, more nearly in synchronism, so that the slack in the train is prevented from running in so harshly as to cause excessive shocks.

The principal object of our invention is to provide a fluid pressure brake equipment having means which may be manually adjusted on any number of cars of a train, as desired, so as to control the rate of build-up of brake cylinder pressure in such manner that the brake apparatus on the desired number of cars at the head end of the train, will be set to restrict the rate of build-up of brake cylinder pressure while the brake apparatus on the remaining cars at the rear end of the train will be set to permit a more rapid rate of build-up of brake cylinder pressure.

Other objects and advantages will appear in the following more detailed description of the invention.

In the accompanying drawings; Fig. 1 is a diagrammatic, sectional view of a fluid pressure brake apparatus embodying our invention; Fig. 2 is a sectional view of a modified form of valve device for manually adjusting the brake apparatus to regulate the rate of build-up of brake cylinder pressure and shown in the position for restricting the rate of build-up of brake cylinder pressure; Fig. 3 is a sectional view of the valve device shown in Fig. 2, shown in the position for permitting a more rapid rate of build-up of brake cylinder pressure; Fig. 4 is a plan view, partly in section, of the mechanism for manually setting the valve device shown in Figs. 2 and 3; and Fig. 5 is an isometric view of the control mechanism for the selector valve operating rod.

As shown in Fig. 1 of the drawings, the fluid pressure brake equipment may comprise a pipe bracket 1 to which is attached a triple valve casing 2, an emergency valve casing 3, and a selector valve casing 4. The triple valve device comprises the casing 2 having a piston chamber 5, connected through passage 6 with the brake pipe 7 and containing piston 8, and having a valve chamber 9, at the opposite side of piston 8, connected through passage 10 with the auxiliary reservoir 11 and containing a main slide valve 12 and a graduating slide valve 13, adapted to be operated by piston 8, through the stem 14.

The emergency valve device comprises the casing 3 having a piston chamber 15, connected to the brake pipe passage 6 and containing a piston 16 and having a valve chamber 17 connected through passage 18 with a quick action chamber 19 and containing a main valve 20 and an auxiliary valve 21 adapted to be operated by piston 16, through the stem 22. The slide valve 20 may be maintained seated by a rocking member 23, having one end engaging the valve and carried by a flexible diphragm 41, subject on one side to the fluid pressure in valve chamber 17 and on the opposite side to emergency reservoir pressure, as supplied from the emergency reservoir 24 through passages 25 and 26 to chamber 27.

The selector valve device comprises the casing 4 having a piston chamber 28 containing a piston 29 and having a valve chamber 30 at the opposite side of the piston containing a slide valve 31 adapted to be operated by piston 29, through a stem 32. A cap 33 closes the open end of piston chamber 28 and mounted in said cap is a coil spring 34 which acts on the piston 29, urging the same toward the left. In the cap 33 is a valve chamber 35 open to the atmosphere by way of port 36, in which is mounted a valve 37, adapted to engage a seat rib 38 for controlling communication from piston chamber 28 to valve chamber 35, and said valve carries an operating rod 39. A coil spring 40 surrounding the rod 39, urges the valve 37 to its seat.

The rod 39 is adapted to be operated manually by means of a mechanism such as shown in Fig. 5 and comprising an operating lever 42, pivotally fulcrumed on a bracket 43, secured to the cap 33 and pivotally connected to the rod 39. At opposite sides of the car, a plate 44 is secured to a suitable portion of the car body and mounted in said plates are rods 45 and 46. The rod 45 carries an arm 47 which is operatively connected to the lever 42 through a link rod 48. At opposite ends of the rod 45 are secured operating handles 49, carrying a projecting portion 50.

The rod 46 has secured at its opposite projecting ends, a locking handle 51, carrying a lug 52.

When either handle 49 is rotated from the position shown in the drawings, in a clockwise direction to the retarded brake cylinder pressure build-up position, the rod 39 is pulled out to the position shown in Fig. 1, by operation of the lever 42 and the handle 49 may be locked in this position by rotation of the handle 51 in a counter-clockwise direction, until the lug 52 is positioned over the projecting portion 50, in such manner that the handle 49 is locked in this operating position.

Associated with the pipe bracket 1 is the usual quick action valve mechanism comprising a piston 53 mounted in a piston chamber 54 formed in a cage 55 and having a stem 56 for operating a brake pipe vent valve 57.

In the operation of the brake apparatus shown in Fig. 1, when the brake pipe 7 is charged with fluid under pressure in the usual manner, fluid under pressure flows from the brake pipe, through passage 6 to piston chamber 5 of the triple valve device and thence, with the triple valve piston 8 in release position, as shown, through feed groove 58 around the piston to valve chamber 9. From valve chamber 9, fluid flows through passage 10 to the auxiliary reservoir 11, thus charging the valve chamber 9 and the auxiliary reservoir 11 with fluid at brake pipe pressure.

In the release position of the triple valve device, an inshot chamber or reservoir 59 is charged with fluid under pressure from the valve chamber 9, by way of port 60 and connected port 61 in slide valve 12 and passage 62. The emergency reservoir 24 is also charged with fluid under pressure from valve chamber 9, by way of port 60 and passage 25.

The valve chamber 30 of the selector valve device is shown as connected to passage 25, so that said chamber is charged with fluid as supplied to the emergency reservoir 24. The valve chamber 30 may also be charged directly from the brake pipe and for this purpose, a passage 63 is provided which is connected to passage 25 at a point in the casing 4. When emergency reservoir pressure is used for charging the valve chamber 30, the brake pipe passage 63 is cut off by the screw plug 64. When it is desired to charge the valve chamber 30 directly from the brake pipe, the plug 64 is removed from passage 63 and is screwed into a threaded opening 65 in the passage 25.

Before starting out on a run, the brakeman adjusts as many brake controlling valve devices from the head end of the train toward the rear for restricting the build-up of brake cylinder pressure as is deemed desirable, by rotating the handle 49, as shown in Fig. 5, in a clockwise direction. This causes the lever 42 to pull out the rod 39 to the position shown in Fig. 1. The handle 49 is locked in this position, by rotating the handle 51 in a counter-clockwise direction, so that the lug 52 engages over the portion 50 of the handle 49.

With the rod 39 in the position shown in Fig. 1, the valve 37 is held unseated, so that fluid under pressure in piston chamber 28 is vented to chamber 35 and thence to the atmosphere, through port 36.

Piston 29 is then shifted to its extreme outer position, by the fluid pressure in valve chamber 30, so that slide valve 31 is positioned to connect a passage 66, leading to the seat of main slide valve 12, through a cavity 67, with a passage 68, which opens into passage 69. The passage 69 is connected to passage 70 leading to the brake cylinder 71, through a cavity 72 in a change-over plate 73.

When the brake pipe pressure is reduced to effect a service application of the brakes, the triple valve piston 8 is moved out, first shifting the graduating valve 13, so as to uncover the service port 74, and then moving the main slide valve 12 until the port 74 registers with passage 75.

Fluid under pressure is then supplied from valve chamber 9 and the auxiliary reservoir 11 to passage 75 and flows thence to passage 76 and through a restricted port 77 in choke plug 78 to passage 70, which leads to the brake cylinder 71. Fluid under pressure is thus supplied to the brake cylinder at a restricted rate.

In the service position of main slide valve 12, a cavity 79 connects passage 62 with passage 66, so that fluid under pressure from the normally charged inshot reservoir 59 is supplied to passage 66 and flows through said passage, past the check valve 80, and through cavity 67 in the selector slide valve 31 to passage 68, which opens into passage 69. From passage 69, fluid flows through cavity 72 in the change-over plate 73 to passage 70 and thence to the brake cylinder 71.

Fluid under pressure is thus supplied from the inshot reservoir 59 to the brake cylinder 71, upon movement of the triple valve device to service application position and this serves to ensure the movement of the brake cylinder piston so as to cause the brake shoes to engage the car wheels.

The brake cylinder pressure is then built up at a slow rate, as permitted by the restricted port 77, on cars at the head end of the train, where the selector valve device is set to the position shown in Fig. 1.

On cars at the rear of the train, the selector valve device is set to its other position, the valve 37 being seated, so that fluid pressures on opposite sides of piston 29 are maintained equalized by flow from the valve chamber 30, through the feed groove 81 to piston chamber 28. When there is no fluid pressure in the brake system, the spring 34 operates to hold the piston 29 and slide valve 31 in the position at the left of the position shown in Fig. 1, so that when the emergency reservoir is charged with fluid under pressure, upon charging the brake pipe, fluid under pressure is supplied to the valve chamber 30 and equalizes through the feed groove 81 into piston chamber 28.

In the inner left hand position of slide valve 31, cavity 67 connects passages 75 and 68 and blanks passage 66. The blanking of passage 66 prevents the flow of fluid under pressure from the inshot reservoir 59 to the brake cylinder in effecting a service application of the brakes, while the connection of passage 75 with passage 68, permits the flow of fluid under pressure from the auxiliary reservoir to the brake cylinder in effecting a service application of the brakes, without passing through the restricted port 77, since fluid under pressure can now flow to the brake cylinder from passage 68, through passing 69, cavity 72 and passage 70 to the brake cylinder. Fluid under pressure is thus supplied from the auxiliary reservoir to the brake cylinder on cars at the rear of the train, where the selector valve 31 is set in its left hand position, at a greater rate than on cars at the head end of the train, where the rate of flow is retarded by the restricted port 77.

When the brake pipe pressure is increased to effect the release of the brakes, the triple piston 8 is shifted to release position, and the main slide valve 12 is thereby shifted to release position, in which cavity 82 in the slide valve connects passage 75 with atmospheric exhaust port 83.

In order that the release of the brakes may not be retarded by flow through the restricted port 77 on the cars at the head end of the train, a by-pass passage 84 containing a check valve 85 is provided. The passage 84 connects passage 69 with passage 75, so that fluid is released from the brake cylinder by way of passage 70, cavity 72, passage 69, passage 84, passage 75, cavity 82 in main slide valve 12 and exhaust port 83, as well as through the restricted port 77.

In effecting a service application of the brakes, the emergency piston 16 is moved out by the gradual reduction in brake pipe pressure, shifting the auxiliary valve 21, so that port 86 registers with port 87 in the main valve 20. Port 87 registers with an atmospheric exhaust port 88, so that fluid under pressure is vented from valve chamber 17 and the quick action chamber 19, at a rate corresponding with a service rate of reduction in brake pipe pressure.

The spring stop 89, engaged by the piston 16 in this movement, then prevents further movement of the piston 16 to emergency position.

Upon a sudden reduction in brake pipe pressure, the pressure reduces in the brake pipe at a greater rate than the pressure in valve chamber 17 is reduced, so that the piston 16 is then moved to emergency position, the graduating valve 21 being first shifted so as to uncover port 90, which registers with passage 91. Fluid under pressure is then supplied from valve chamber 17 and the quick action chamber 19 to piston chamber 54.

The emergency quick action piston 53 is then actuated to unseat the brake pipe vent valve 57 and thus vent fluid from the brake pipe, so as to cause quick serial action throughout the train, in the usual well known manner.

In the emergency position of slide valve 20, a cavity 92 connects passage 25 with passage 93, leading to the passage 75, so that fluid under pressure is supplied from the emergency reservoir 24 to the brake cylinder, as well as from the auxiliary reservoir, by operation of the triple valve device.

In Figs. 2, 3, and 4 a modified form of my invention is shown, in which the selector valve is in the form of a rotary slide valve 94 having a seat on a casing 4', which is provided with ports and passages corresponding with the ports and passages of the casing 4.

The rotary valve 94 is contained in a valve chamber 95 of a cover plate 96 and is adapted to be rotated by an operating stem 97. The stem 97 carries at its outer end a gear wheel 98 which meshes with a gear wheel 99. The gear 99 is secured to a shaft 100 supported in bearings provided in the cover plate. Secured to the outer end of the shaft 100 is an arm 101 and connected to the outer end of said arm is an operating rod 102, having a handle 103 at its outer end.

A member 104 secured at the side of the car has an opening 105 through which the rod 102 extends and said member is provided in the opening 105 with an upstanding lug 106 adapted to engage in notches 107 and 108 cut in the rod 102. A coil spring 109 surrounds the rod 102 and is interposed between the member 104 and a collar 110 secured to the rod 102, so that the pressure of the spring urges the rod 102 toward the left.

In the position shown in Fig. 4, the lug 106 engages in the notch 108 and thus locks the rod against longitudinal movement. With the rod 102 in this position, the rotary valve 94 is maintained in the position for retarding the build-up of brake cylinder pressure, as shown in Fig. 2. In this position, cavity 111 in the rotary valve connects passages 68 and 66 and thus provides the same connections as the selector slide valve 31 of the Fig. 1 construction.

On the desired number of cars from the head end of the train toward the rear, the rotary valves 94 are set to the retarded brake cylinder build-up position, as shown in Fig. 2.

On the remaining cars at the rear of the train, the rod 102 is adjusted so that the lug 106 engages in the notch 107 of the rod 102. The rod 102 may be set to either position by lifting the handle 103, so that the rod 102 is operated to disengage the lug 106 from one notch in the rod and then the rod is shifted longitudinally until the other notch is positioned to register with the lug 106.

When the rod 102 is shifted, so that the lug 106 engages in the notch 107, the rotary valve 94 is positioned as shown in Fig. 3, in which the cavity 111 in the rotary valve 94 connects passage 75 with passage 68, corresponding with the connections made by the selector slide valve 31 of the Fig. 1 construction.

The operation is identical with that described in connection with the Fig. 1 construction and need not be repeated.

With the Fig. 1 construction, however, the selector piston 29 will be automatically returned to the direct brake cylinder build-up position, when the pressure in the emergency reservoir falls sufficiently to permit the spring 34 to shift the piston, as would be the case where a car is taken out of a train, and the fluid pressure is allowed to escape.

In Fig. 2, the plug 64 is shown inserted in the passage 25, so that communication through passage 63 to the rotary valve chamber 95 is permitted. The valve chamber 95 is thus charged with fluid under pressure directly from the brake pipe when the triple valve piston 8 is in release position. When the piston is in application position, the passage 63 opens to the auxiliary reservoir side of the piston 8, so that the rotary valve chamber 95 is then maintained charged with fluid under pressure from the auxiliary reservoir.

While one illustrative embodiment of our invention has been described in detail, it is not our intention to limit its scope to this embodiment or otherwise than by the terms of the appended claim.

Having now described our invention, what we claim as new and desire to secure by Letters Patent, is:

In a fluid pressure brake, the combination with a brake pipe, brake cylinder, and a brake controlling valve device operated upon a reduction in brake pipe pressure for supplying fluid under pressure to the brake cylinder, of valve means for controlling communication through which said brake controlling valve device supplies fluid under pressure to the brake cylinder and operative to vary the rate at which fluid is supplied to the brake cylinder comprising a valve and a movable abutment operated by a variation in fluid pressure for operating said valve, a valve for varying the fluid pressure on said abutment, and manually operated means for operating said last mentioned valve.

CLYDE C. FARMER.
ELLIS E. HEWITT.